United States Patent
Sondergard et al.

(10) Patent No.: US 9,371,251 B2
(45) Date of Patent: *Jun. 21, 2016

(54) METHOD FOR STRUCTURING A SURFACE BY MEANS OF REACTIVE ION-BEAM ETCHING, STRUCTURED SURFACE AND USES

(75) Inventors: Elin Sondergard, Cachan (FR); Sébastien Le Roy, Pantin (FR); Alban Letailleur, Paris (FR); Constance Magne, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 718 days.

This patent is subject to a terminal disclaimer.

(21) Appl. No.: 13/513,136

(22) PCT Filed: Nov. 24, 2010

(86) PCT No.: PCT/FR2010/052508
§ 371 (c)(1),
(2), (4) Date: Aug. 1, 2012

(87) PCT Pub. No.: WO2011/067512
PCT Pub. Date: Jun. 9, 2011

(65) Prior Publication Data
US 2012/0288681 A1    Nov. 15, 2012

(30) Foreign Application Priority Data

Dec. 1, 2009 (FR) ...................................... 09 05804

(51) Int. Cl.
*B31D 3/00* (2006.01)
*B44C 1/22* (2006.01)
(Continued)

(52) U.S. Cl.
CPC .............. *C03C 21/005* (2013.01); *C03C 14/004* (2013.01); *C03C 15/00* (2013.01); *C03C 2214/08* (2013.01); *C03C 2217/77* (2013.01); *Y10T 428/24479* (2015.01)

(58) Field of Classification Search
CPC ................... H01L 21/0203; H01L 21/02109; C23F 1/02
USPC ................................................ 216/56, 63, 80
See application file for complete search history.

(56) References Cited

U.S. PATENT DOCUMENTS 6,191,053 B1 * 2/2001 Chun et al. .................... 438/780
6,524,773 B1 * 2/2003 Borrelli et al. ................ 430/322
(Continued)

FOREIGN PATENT DOCUMENTS

WO    WO 00/64829    11/2000
WO    WO 2004/025334    3/2004

OTHER PUBLICATIONS

International Search Report as issued for International Application No. PCT/FR2010/052508, dated Mar. 1, 2011.
(Continued)

*Primary Examiner* — Thomas Pham
(74) *Attorney, Agent, or Firm* — Pillsbury Winthrop Shaw Pittman LLP

(57) ABSTRACT

A process for forming an array of irregularities or features that are submicron-size in height and that have a characteristic lateral dimension that is micron- or submicron-size, over a surface of a material by reactive-ion etching, the process including: supplying the material with a thickness at least equal to 100 nm, the material being a solid hybrid material that includes: a simple silicon oxide or a mixed silicon oxide, most of the oxides in the case of a mixed oxide being silicon oxide, an oxide molar percentage in the material being at least 40%; and a species, of a different nature to the silicon of the oxide, a molar percentage of the species in the material ranging from 1 mol % or even up to 50 mol % while remaining below the percentage of the silicon oxide, at least most of the species having a largest characteristic dimension smaller than 50 nm, optionally heating the hybrid material before the etching; structuring the surface of the hybrid material, without masking, with etching that lasts less than 30 minutes over an etching area greater than 1 cm², until the array of features is formed, the structuring optionally being accompanied by heating of the hybrid material.

7 Claims, 2 Drawing Sheets

(51) Int. Cl.
*C03C 15/00* (2006.01)
*C23F 1/00* (2006.01)
*C03C 25/68* (2006.01)
*C23F 3/00* (2006.01)
*C03C 21/00* (2006.01)
*C03C 14/00* (2006.01)

(56) References Cited

U.S. PATENT DOCUMENTS

| 6,772,608 | B1* | 8/2004 | Drost et al. | 65/30.1 |
|---|---|---|---|---|
| 2002/0186469 | A1* | 12/2002 | Kawazu et al. | 359/486 |
| 2009/0231714 | A1 | 9/2009 | Zhao et al. | |
| 2010/0246016 | A1* | 9/2010 | Carlson et al. | 359/599 |
| 2011/0062849 | A1* | 3/2011 | Carlson et al. | 313/110 |

OTHER PUBLICATIONS

Dong et al., "Ultrafast dynamics of copper nanoparticles embedded in soda-lime silicate glass fabricated by ion exchange," Thin Solid Films, vol. 517, 2009, pp. 6046-6049.

Armelao et al., "Recent trends on nanocomposites based on Cu, Ag, and Au clusters: A closer look," Coordination Chemistry Reviews, vol. 250, 2006, pp. 1294-1314.

Gervasini et al., "Insight into the properties of Fe oxide present in high concentrations on mesoporous silica," Journal of Catalysis, vol. 262, 2009, pp. 224-234.

Yeshchenko et al., "Optical properties of sol-gel fabricated $Ni/SiO_2$ glass nanocomposites," Journal of Physics and Chemistry of Solids, vol. 69, 2008, pp. 1615-1622.

Feng et al., "Synthesis and characterization of tin oxide nanoparticles dispersed in monolithic mesoporous silica," Solid State Sciences, vol. 5, 2003, pp. 729-733.

Kim et al., "Thermowetting embossing nanoimprinting of the organic-inorganic hybrid materials," Thin Solid Films, vol. 476, 2005, pp. 181-184.

Yoo et al., "Black surface structures for crystalline silicon solar cells," Materials Science and Engineering B, vol. 159-160, 2009, pp. 333-337.

Stowell et al., "Reactive Ion Etching of Barium Strontium Titanate/Oxide Composites," IEEE, 1996, pp. 859-862.

Zakka et al., "Roughness Formation During Plasma Etching of Composite Materials: A Kinetic Monte Carlo Approach," IEEE Transactions on Plasma Science, vol. 35, No. 5, Oct. 2007, pp. 1359-1369.

Schwartz et al., "Reactive Ion Etching." in: Hughes et al., *Proceedings of the Symposium: Etching for Pattern Definition* (Dielectrics and Insulation and Electronics, The Electrochemical Society, Inc., 1976), pp. 122-132.

Cheung, N., "Reactive Ion Etching (RIE)," EE143 Lecture # 16 [online], Nov. 20, 2004 [retrieved on Jul. 12, 2010]. Retrieved from the Internet: <URL:http://www.eng.tau.ac.il/~yosish/courses/vlsi1/I-12-RIE.pdf>.

* cited by examiner

METHOD FOR STRUCTURING A SURFACE BY MEANS OF REACTIVE ION-BEAM ETCHING, STRUCTURED SURFACE AND USES

CROSS-REFERENCE TO RELATED APPLICATIONS

This application is the U.S. National Stage of PCT/FR2010/052508, filed Nov. 24, 2010, which in turn claims priority to French Application No. 0905804, filed Dec. 1, 2009. The content of these applications are incorporated herein by reference in their entirety.

The present invention relates to the field of surface structuring and in particular relates to a process for structuring a surface using reactive-ion etching, to a product with a structured surface and to its uses.

The structuring of materials is of considerable interest because it is applicable to many technological fields.

Creating a network of geometric features allows a material to be given a novel and original function but does not change its composition and its bulk properties.

Due to the small size of the features, which especially have a submicron-size width or period, structuring techniques are mainly techniques that use masks and wet or dry etching; they are especially lithographic techniques (optical lithography, e-beam lithography, etc.) used in microelectronics or in (small) integrated optical components.

Reactive-ion etching (RIE) is one of a number of techniques employed to structure glass with reactive gases that are fluorinated or chlorinated derivatives, sulfur hexafluoride ($SF_6$) or carbon tetrafluoride ($CF_4$) being the most common, by masking, often lithographic masking.

They are however unsuitable for mass producing products, especially products made of glass, for one or more of the following reasons:
- their high cost (manufacture of the mask, installation, alignment, etc.);
- their low throughput (scan rate) and their complexity (several steps);
- the limited size of the features (wavelength limited); and
- the small areas that can be structured.

Thus, the subject matter of the present invention is firstly an effective process for manufacturing a product, especially a glass product, that is structured at the submicron-size scale and that meets various industrial constraints: it is quick and simple to create (no need for a mask, preferably only a single step) and/or suited to an area of any size, even of the largest of sizes, and provides flexibility in and control over the type and/or the size of the features and their density.

This process is also intended to enlarge the range of structured products, especially glass products, available and is especially intended to provide novel geometries and novel functionalities and/or applications.

For this purpose, the invention firstly provides a process for structuring a surface, i.e. for forming at least one array of irregularities called features (generally having the same shape on average) that are submicron-size in height and that have at least one lateral dimension (called the width) that is submicron- or micron-size (submillimeter size) by reactive ion etching, which comprises the following steps:
- supplying said material with a thickness at least equal to 100 nm, the material being a solid hybrid material that comprises:
  a simple silicon oxide or a mixed silicon oxide, the oxide molar percentage in the material being at least 40%, especially between 40 and 99%; and
  at least one species, of a different nature to the silicon of the oxide, especially being more mobile than the silicon oxide under the reactive ion etching, which species is preferably a metal, the molar percentage of the one or more species in the material ranging from 1% or even up to 50%, especially ranging from 5% to 20% or even 40% while remaining below the percentage of said oxide, at least most of the species, even at least 80% or at least 90%, having a largest characteristic dimension (called the size) smaller than 50 nm, preferably 25 nm or less, even 15 nm or less,
  especially said hybrid material being metastable before the etching, i.e. kinetically stable under normal temperature and pressure conditions and thermodynamically unstable under normal temperature and pressure conditions, and being in a local potential-energy minimum separated from the global minimum by a given activation energy Ea;
- optionally (pre)heating the material before the erosion, especially in order to reduce (not to zero) the activation energy to a value E1 that is then supplied by the etching, (optional heating because if Ea is too high, the kinetics of the aggregation of the mobile metal species are too slow relative to the rate of etching of the hybrid material), the (pre)heating and etching optionally being separated in time, the preheating optionally being replaced by an IR radiation treatment;
- structuring the surface of said hybrid material under said reactive-ion etching, the supply of energy from the ions of the beam thus making said (metastable) hybrid material kinetically unstable, the structure thus being obtained by the formation of a self-assembled mask composed of an array of zones (in the form of droplets) essentially of said metal species, and/or of an array of zones enriched with said metal species of the material, the mask being formed by virtue of the aggregation of said metal species on the surface of said hybrid material,
  with the etching of said (metastable) solid hybrid material lasting less than 30 minutes, preferably lasting 15 minutes or less, even 10 minutes or less, it thereby being ensured that the material is not consumed, especially when it is a film;
  by the reactive gas typically being a fluorinated or chlorinated gas ($SF_6$, $CF_4$, $O_3F_2$, $CHF_3$ or $O_2F_3$);
  with an etching area greater than 1 $cm^2$, even greater than or equal to 10 $cm^2$, or even 1 $m^2$; and
  with an electric field optionally being applied in order to make the etching directional, until said array of features is formed,
- optionally heating the hybrid material during the etching, especially so as to reduce (not to zero) the activation energy.

Hitherto, maskless structuring, under reactive-ion etching, of glass, and more widely of silicon oxides, with a high throughput has never been observed.

However, the Applicant has identified intrinsic properties of an oxide-based material that make maskless reactive-ion etching possible and that control the morphology of the surfaces created during the etching.

The silicon oxide and the mobile element will separate if enough energy is supplied to them by the reactive-ion etching.

The mask is created at the same time as the etching. The intrinsic properties of the material control the surface morphology created during the etching.

It is thus possible to make a directly functional structured material in a single step.

It is thus enough to add at least one ad hoc species to the oxide, the species especially having the following properties that a person skilled in the art will select:
- a higher mobility than that of the Si oxide under reactive-ion etching, in order for segregation and "mask" effects to dominate over surface relaxation which smoothes the surface (thus, to select the species use may be made, for example, of studies of ion diffusion in silicates or other oxides); and
- a sufficiently high cohesion energy to allow its segregation.

There is a sufficient amount of the species over the large etching area to create the mask and obtain a sufficient density of features.

The species is found to sufficient depth related to the desired etching depth, so as to create the mask during the etching.

The species is in intimate contact with the oxide but is not miscible.

The size of the species is limited for a uniform distribution of the species in the material and therefore a more uniform structure.

The species content in the Si oxide can be measured by microprobe analysis or XPS. Naturally, after the structuring operation, in the structured thickness, the species content may vary, for example with a concentration profile dependent on height in the structure, and even on the state of the metal.

The judiciously selected class of Si oxide/metal hybrid materials according to the invention spontaneously creates a sufficiently dense, uniform mask that self-assembles during the reactive-ion etching, thereby leading to one or more of the following (maskless) characteristics:
- a uniform structure, i.e. an average height H, an average shape and an average density that are similar over the entire area eroded;
- 2D relief features with generally rounded (circular) edges, for example cones or bumps, having an average lateral dimension or width W that is submicron-size, the features optionally being substantially symmetric and therefore having an average "maximum" lateral dimension, or length L, that is submicron-size and similar or substantially equal to the width (width W about=length L or at least the width W is greater than or equal to 0.7L);
- features that are isotropic, i.e. that have no privileged direction(s) of orientation, typically the case for a normal or near-normal angle of attack;
- a dense network of features, i.e. having a ratio of the average separation D to the width W of less than 10, of 5 or less, or even of 2 or less, and this over an area of 1 cm$^2$, 100 cm$^2$ or even 1 m$^2$; and
- a feature height H that is substantial and that is obtained rapidly.

For each feature, the height taken into account is the maximum height; the width is measured at the base.

The separation D is the average distance between the centers of two adjacent features.

The distances H, W, D may be measured by AFM and/or scanning electron microscopy SEM. The averages are for example obtained for at least 50 features.

The structured material comprises an array of features, generally having:
- an average height H greater than 5 nm, even greater than or equal to 30 nm, even 50 nm;
- an average width W possibly less than 300 nm, especially for optical applications, and preferably less than 200 nm; and
- an average separation D of less than 300 nm and preferably less than 200 nm.

The aspect ratio (H/W) may be greater than 3.

The density, i.e. D/W, may depend on the height.

Preferably, the width W is less than or equal to 5D, especially less than D.

The mean square deviation in the height H and the width W may be less than 30% (for example at high temperature), or 10% or less, or even 5% or less.

The mean square deviation in the separation D may be less than 50% (for example at high temperature) or less than 30%, or even 10% or less.

The hybrid material may be termed metastable. The known definition of metastability is the capacity of a material to be kinetically but not thermodynamically stable. The transition to the steady state either occurs slowly or at a zero rate. If a physico-chemical system is represented by its potential energy, a metastable state will be characterized by a state that corresponds to a local potential-energy minimum. In order for the system to be able to reach the state of global minimum energy corresponding to the state of thermodynamic equilibrium, an amount of energy, called the activation energy Ea, must be supplied to it.

For a given hybrid, the activation energy may depend on the manufacturing process.

The structure is induced by the intrinsic metastability of the material and by selective etching of the silica. This metastability is controlled by the selection of the mobile species.

The hybrid material may consist essentially of mineral material. The sum of the oxide and said metal may form at least 70 mol % or even 90 mol % or 95 mol % of the hybrid material.

The hybrid material may contain other "neutral" elements for the reactive-ion etching (especially less than 30%), preferably less than 10% or 5%.

The structuring process according to the invention may be easily automated and associated with other conversion operations carried out on the product. The process also simplifies the production sequence. The process is suited to large-volume and/or large-scale manufacture of products, especially glass products for the electronics, construction or automotive industries, especially windows. The structuring process according to the invention furthermore allows the characteristic dimensions of the features to be made ever smaller over larger and larger areas, with an acceptable tolerance to texturing defects, i.e. one that does not impair the desired performance.

The plasma may instantaneously supply sufficient energy for the structuring (exceeding the activation energy).

The etching process furthermore naturally heats the oxide, which may alone be enough to provide the activation energy or, alternatively, additional heating may be necessary as seen above.

The temperature reached at the surface varies depending on the hybrid material and on the conditions of the structuring operation. The reference temperature is the temperature of the backside of the material (side opposite the eroded surface).

More generally, the temperature may also play a role in the structuring of the hybrid material according to the invention.

Moreover, to initiate or modify the structure (modification of the feature and/or acceleration), for example to increase the height of the reliefs (or bumps) or the aspect ratio, or to decrease the density, the material is heated to a temperature above 50° C., even 70° C. or more, preferably 100 even 120° C. or more, especially to a temperature ranging from 150° C. to 300° C., before the etching and/or during (all or some of) the etching.

There is a contest between segregation and relaxation during the reactive-ion etching. Heating, during the etching, preferably to a given controlled temperature, surprisingly enhances the segregation over the relaxation and structuring is therefore promoted.

If the temperature is increased in a relief configuration, the species forms larger aggregates (in the peaks of the reliefs), which aggregates are more spaced out, and the height of the reliefs is therefore especially increased and the space between reliefs is also increased.

The temperature of the heating/energy-supply operation may furthermore be limited (for reasons of the cost of energy and/or the withstand capability of associated material or materials, for example the limited thermal withstand capability of an organic substrate bearing a film of the hybrid material).

Naturally, heating and plasma power may be combined to obtain a wide variety of width/height/density configurations.

Because it is effective, the duration of the etching may be 15 minutes or less, even 15 minutes or less.

The etching is carried out under vacuum. For example in a thin-film deposition reactor.

Before it has been structured according to the invention, the surface is not necessarily smooth and may have already been structured.

In the structurable hybrid material (or in the thickness underlying the structured surface), the species may optionally be ionized (therefore oxidized) or it may not be, it may be diluted (isolated in the material) and/or even in aggregate form, the aggregates preferably being (substantially) spherical.

This depends on the process used to manufacture the structurable hybrid material, and on its incorporation process in particular.

The species may be incorporated by ion implantation (by ion bombardment), by ion exchange, or by incorporation of particles or in situ growth (from metal salts, etc.) as described below.

The species is preferably chosen from at least one of the following, especially metal, species:
  silver Ag, especially for an optical function (absorption induced at the UV/visible boundary) and/or catalytic and/or antibacterial function;
  copper Cu, especially for an optical function;
  gold Au, for grafting biological molecules, for sensors, for (nonlinear) optics, and/or for an antibacterial function;
  cobalt Co, for a magnetic function;
  iron Fe, for a magnetic and/or catalytic function;
  platinum Pt, for a catalytic function;
  nickel Ni, for a magnetic and/or catalytic function;
  tin Sn, for electrical functions; and
  even gallium Ga, antimony Sb or indium In, for a display or broadcasting function.

Lead Pb and molybdenum Mo are preferably not used for environmental reasons.

Several metals can form an aggregate providing a given functionality, Co/Pt for a magnetic memory for example.

Use of other transition metals such as Ti, Nb, Cr, Cd, Zr (in particular in silica), Mn may be envisioned.

For a more effective structuring, the effective charge on the species is zero or less than 0.5 (given by EELS) so as to allow the species to aggregate.

Especially for silica, aluminum Al and boron B are preferably not used because they integrate into the silica lattice and do not aggregate easily.

More particularly, transition metals and even certain metalloids are preferred to alkali or alkaline-earth metals that have too high an etching rate. Thus, for glass, it may be stated that Li and Na are not suitable because they are sputtered and do not aggregate (fast enough).

The oxides may furthermore be transparent (enough) in the visible and even in a range that extends into the near or far IR and even the near UV depending on the targeted applications.

A mixed oxide may be used, the mobile species not aggregating (under normal temperature and pressure conditions) but still being sufficiently mobile under reactive-ion etching to form the structures.

The oxide added to the Si oxide is preferably chosen from at least one of the following oxides: alumina, zirconia, titanium oxide, cerium oxide, magnesium oxide, especially mixed aluminum/silicon oxide, mixed zirconium/silicon oxide, mixed titanium/silicon oxide and preferably a glass.

There are several hybrid materials according to the invention.

The hybrid material may firstly be an ion-exchanged glass, especially a soda-lime glass, preferably ion exchanged with at least one of said following species: silver, copper—these species being ionized during the exchange.

The exchange depth is typically about one micron but it can be up to several tens of microns deep. The exchanged metal is therefore almost uniformly distributed in the eroded part of the material (<1 μm).

Ion exchange is the capacity of certain ions in the glass, in particular cations such as alkali-metal ions, to be exchanged with other ions having different properties.

The ion exchange may be the exchange of certain ions in the glass with ions chosen from, whether in combination or not, barium, cesium, thallium, and preferably silver or copper.

Silver is very mobile in the matrix and has a strong tendency to aggregate.

The exchanged ion content in the hybrid material can be measured using a microprobe before and after the structuring operation.

The ion exchange is obtained by known techniques. The surface of the glass substrate to be treated is placed in a bath of molten salts of the exchange ions, for example silver nitrate ($AgNO_3$), at a high temperature between 200 and 550° C., and for a sufficient period of time corresponding to the desired exchange depth.

The glass in contact with the bath may advantageously be concomitantly subjected to an electric field that mainly depends on the conductivity of the glass and its thickness, and preferably varies between 10 and 100 V. In this case, the glass may then undergo another heat treatment, advantageously at a temperature lying between the exchange temperature and the glass transition temperature of the glass, in order to diffuse the exchanged ions in a direction normal to the face of the glass provided with the electrode, so as to obtain an index gradient with a linear profile.

The glass chosen may be extra-clear glass. The reader may refer to application WO 04/025334 for the composition of an extra-clear glass. In particular a soda-lime-silica glass containing less than 0.05% Fe III or $Fe_2O_3$ may be chosen. Diamant glass from Saint-Gobain, Albarino glass (whether textured or smooth) from Saint-Gobain, Optiwhite glass from Pilkington or B270 glass from Schott may, for example, be chosen.

The ion exchange thus enables easy, industrially reproducible treatment of large areas. It allows the glass to be worked on directly and simply without intermediate and/or additional steps such as film deposition or etching being required.

Silver is, for example, used. The depth to which silver ions $Ag^+$ diffuse in the glass, replacing sodium ions $Na^+$, is a function of the time the substrate is left in the bath.

As a variant to the AgNO$_3$ bath, a film of silver metal may be deposited. This film is deposited by magnetron sputtering, CVD, ink-jet printing, or screen printing. A film forming an electrode is moreover deposited on the opposing face. The electric field is then applied between the silver film and the metal film. After the exchange, the electrode film is removed by polishing or chemical etching.

The electric field applied between the metal film or the bath and the electrode therefore causes the ion exchange. The ion exchange is carried out at a temperature of between 250° C. and 350° C. The exchange depth is a function of the field strength, the time that the substrate is subjected to this field and the temperature at which the exchange is carried out. The field strength lies between 10 and 100 V.

For example, such ion exchange may be carried out for 10 hours on a 2 mm-thick sheet of, preferably extra-clear, glass at a temperature of 300° C. and under a 10 V/mm field.

Conventional soda-lime glass such as Planilux glass from Saint-Gobain may be used to obtain silver nanoparticles after ion exchange with the glass. The penetration depth and size of the silver particles may be modified by varying the experimental conditions: increasing the duration and the temperature of the exchange gives larger particles to a greater depth and therefore a more marked yellow color. Adding an electric field during the exchange allows the penetration depth to be increased without increasing the particle size. Thus, the penetration depth may be adjusted to correspond to the etching depth so that the yellowing disappears after the etching, or the penetration depth may be slightly greater than the erosion depth by a few microns if the yellowing is less pronounced and therefore optically acceptable after the erosion.

Mention may be made, by way of exemplary copper-exchanged glass, of the publication by Dong et al. entitled "ultrafast dynamics of copper nanoparticles embedded in sodalime silicate glass fabricated by ion exchange" Thin Solid Films 517 (2009) pages 6046-6049.

The exchanged, structured glass may be a monolithic, laminated or two-component unit. After the structuring operation has been carried out, the exchanged, structured glass may also be subjected to various glass conversion operations: tempering, shaping, laminating, etc.

The hybrid material may be a bulk material or a film added over the entire substrate, whether the substrate is thick or thin, flat or curved, opaque or transparent, mineral or organic. The film made of the structurable hybrid material may be adhesively bonded to, etc. or preferably deposited on an especially glass substrate. This film may be part of a (thin) film multilayer present on the, especially glass, substrate.

This film made of the structurable hybrid material may preferably be transparent and have a refractive index that is for example greater than that of the glass (typically about 1.5).

The film made of the structurable hybrid material may be deposited by any known deposition technique directly on the substrate or on one or more underlying (thin, etc.) functional films.

In particular, it may be deposited on a (thin) functional film, for example a functional oxide film such as a transparent conductive oxide (TCO) such as ITO (indium tin oxide), ZnO, a mixed or simple oxide based on tin, indium or zinc or a photocatalytic film (TiO$_2$ in the anatase form for example).

This hybrid-material film may advantageously be deposited on an alkali-metal barrier film (typically made of Si$_3$N$_4$ or SiO$_2$) in order to prevent alkali-metal ions from migrating from the glass into the film during various heat treatments (anneal or temper, etc.).

The substrate is not necessarily a mineral substrate and it may be made of plastic or a hybrid material in order to obtain flexibility and shaping properties that cannot be accessed with glass substrates. In this case, the system used must have a low activation energy, because heat treatment at a temperature above 300° C. and most often above 200° C. is not possible.

It is possible to provide a step of depositing said film made of the hybrid material, the step being carried out on a structuring production line.

The hybrid material may be a bulk sol-gel or a sol-gel film, especially a film on a transparent, (mineral or organic) glass substrate. Sol-gels have the advantage of withstanding even high-temperature heat treatments (for example (bending) tempering operations) and UV exposure.

This may especially be an Si oxide obtained by the sol-gel process and incorporating said metal or metalloid in the form of optionally precipitated (nano)particles, especially of Ag, Cu or Au.

The nanoparticles are preferably uniformly distributed in the bulk material and/or film. Preferably the largest dimension of the particles (formed or inserted, discrete or clustered; precipitated) is smaller than 25 nm and even more preferably smaller than 15 nm, and the aspect ratio of the particles is less than 3, the particles preferably being spherical.

The nanoparticle content in the sol-gel can be measured by microprobe, XPS or EDX.

Silica has the definite advantage of being a transparent oxide, titanium oxide and zirconia of having high refractive indices. By way of indication, at 600 nm, a silica film typically has a refractive index of about 1.45, a titanium-oxide film a refractive index of about 2 and a zirconia film a refractive index of about 2.2.

The film may essentially be based on silica, especially because it adheres well to and is compatible with a glass substrate.

The sol precursor of the material forming the silica film may be a silane or silicate precursor.

For an (essentially) inorganic film, a film based on tetraethoxysilane (TEOS) or potassium, sodium or lithium silicate may be chosen and for example deposited by flow coating.

The silica film may thus be based on an aqueous solution of sodium silicate converted into a hard film by exposure to a CO$_2$ atmosphere.

The manufacture of a bulk hybrid material using the sol-gel process for example comprises the following steps:

hydrolysis of the precursor of the constituent material of said Si oxide, especially hydrolysis of a hydrolyzable compound such as a halide or alkoxide, in a solvent, especially an aqueous and/or alcoholic solvent, then maturing the sol;

mixing a colloidal suspension of particles of said metals in a solvent, especially an aqueous and/or alcoholic solvent, and/or a salt of said metal into the sol in order to grow particles of said metals in situ, this addition possibly taking place at the start of the hydrolysis or after the sol has matured enough to limit the reaction kinetics; and condensing the precursor and optionally removing the solvent so as to increase the viscosity and obtain a solid gel.

The manufacture of a film of hybrid material using the sol-gel process for example comprises the following steps:

hydrolysis of the precursor of the constituent material of said Si oxide, especially hydrolysis of a hydrolyzable compound such as a halide or alkoxide, in a solvent, especially an aqueous and/or alcoholic solvent, then maturing the sol;

mixing a colloidal suspension of particles of said metals in a solvent, especially an aqueous and/or alcoholic solvent, and/or a salt of said metal into the sol in order to grow particles of said metals in situ, this addition possibly taking place at the start of the hydrolysis or after the sol has matured enough to limit the reaction kinetics;

depositing, for example by spin coating or flow coating, the film and evaporating the solvent; and carrying out a heat treatment so as to condense the precursor and possibly remove the solvent.

The choice of the colloidal suspension allows the size of the inserted particles to be adjusted if necessary. As the suspension is dispersed in the sol, its compatibility with the sol is monitored to prevent aggregation of the particles. Adding the salt of said metal is much easier and reported more often in the literature.

Water or low-molar-mass alcohols with a low boiling point (typically below 100° C.) are preferred as the solvent so that the metal salt can dissolve properly.

The number of nanoparticles present in the oxide/metal hybrids can be easily controlled by controlling the synthesis conditions, the number of nanoparticles increasing with the amount of metal introduced into the sol.

The formation of hybrid metal/metal-oxide materials using the sol-gel process is widely described in the literature. A wide variety of metal/oxide pairs in the form of films or bulk materials has thus been synthesized. The metal particles are preferably created in situ in the matrix by adding a salt of the corresponding metal and by applying a reducing treatment afterwards (most often a heat treatment or otherwise a treatment using a reducing agent: $H_2$, hydrazine, etc.).

In the publication entitled "Recent trends on nanocomposites based on Cu, Ag, and Au clusters: A closer look" (L. Armelao et al., Coordination Chemistry Reviews, 2006, 250, page 1294), it is reported that up to 10 wt % of silver and copper salt was introduced into silica films obtained by the sol-gel process and that particles of Ag metal or $Cu/CuO_x$ particles of a few nm in size were obtained in a controlled way after a heat treatment (at a temperature above 500° C.). The author demonstrates the importance of the heat treatment on the size and oxidation state of the particles obtained and also reports that other metal or oxide particles were obtained in a silica matrix. Most often, a porous matrix is used as the host for the nanoparticles. However, it is possible, based on these studies, to obtain a material with no artificial porosity. Thus, in the publication "Insight into the properties of Fe oxide present in high concentrations on mesoporous silica" (Gervasini et al. Journal of Catalysis 2009, 262, page 224), mesoporous silica (i.e. having a characteristic pore size of 3-10 nm) containing up to 17 wt % of $Fe_2O_3$ catalytic particles was obtained.

In the publication entitled "Optical properties of sol-gel fabricated $Ni/SiO_2$ glass nanocomposites" (Yeshchenko O. A. et al., Journal of Physics and Chemistry of Solids, 2008, 69, page 1615), it was reported that nickel nanoparticles were obtained for optical applications by heat treating nickel nitrate impregnated in a silica matrix. Finally, in the publication entitled "Synthesis and characterization of tin oxide nanoparticles dispersed in monolithic mesoporous silica" (Y. S. Feng et al., Solid State Science, 2003, 5, page 729), 4-6 nm $SnO_2$ particles were obtained at 20% in the mesoporous silica after a heat treatment at 600° C.

In addition, this sol-gel method enables additional functionalities to be given to the film. The surface structured by said process may then be functionalized to obtain novel wetting properties. In particular, patent WO 00/64829 describes the creation of a hydrophobic and oleophobic coating comprising at least one fluoroalkoxysilane having the general formula $CF_3-(CF_2)_m-(CH_2)_nSi(X)_{3-p}R_p$ (where m=0 to 15, n=1 to 5, p=0, 1 or 2 and where X is a hydrolyzable group and R an alkyl group), a system of aqueous solvents preferably consisting of an alcohol and about 10% water, and at least one catalyst chosen from an acid and/or a Brønsted base. This compound may be deposited over wide areas (greater than 1 m²) of glass products or functional metal-oxide films, in particular textured products, after a silica-based primer layer has optionally been deposited. The combination of this process and the surface texture yields superhydrophobic properties (of the lotus-effect type).

The preferred methods for depositing the organic films are dip coating or spraying of the sol followed by spreading of the droplets by doctoring or brushing, or even by heating as especially described in the article entitled "Thermowetting structuring of the organic-inorganic hybrid materials" W-S. Kim, K-S. Kim, Y-C. Kim, B-S Bae, 2005, thin solid films, 476 (1), pages 181-184. The chosen method may also be spin coating.

Naturally, an anneal at at least 400° C. is preferred, especially an anneal above 500° C., for at least 30 minutes and even for 1 hour, in order to sufficiently condense the oxide, reduce the activation energy and form aggregates of said metal, and below 800° C., especially up to 750° C., so as to provide a sufficient reaction rate and so as not to damage the glass substrate.

This anneal may advantageously be combined with the step of tempering the glass, which operation consists in heating the glass to a high temperature (typically between 550° C. and 750° C.) and then rapidly cooling it.

There are other structurable hybrid-material films.

Said hybrid material may be a silica film deposited by physical vapor deposition, typically by evaporation or sputtering (especially magnetron sputtering), on a substrate, especially a transparent, glass substrate, especially by codeposition of the species (from the aforementioned list), especially copper, silver or gold, and the silica oxide using a target made of the oxide element in an oxygen atmosphere, or using a target made of silica.

Sputtering is generally preferred to evaporation because of its much higher deposition rate, in order to manufacture 100 nm thick or even micron-size films more rapidly. Thus, if the deposition rate for evaporation is generally about 1 Å/min, with a maximum rate of 1 Å/s, magnetron sputtering deposition rates typically lie between 1 Å/s and several tens of nm/s.

For example, to deposit a mixed $SiO_2$/copper film, it is possible to employ either codeposition using silicon and copper targets, with oxygen being introduced, or to employ a copper target and a silica target directly.

The substrate may be a glass substrate. Within the context of the invention, the expression "glass substrate" is understood to mean either a mineral glass (soda-lime-silica, borosilicate, glass-ceramic, etc.) substrate or an organic glass (for example a thermoplastic polymer such as a polyurethane or a polycarbonate) substrate.

Within the context of the invention, a substrate is termed "rigid" when, under normal temperature and pressure conditions, it has a modulus of at least 60 GPa for a mineral element and at least 4 GPa for an organic element.

The glass substrate is preferably transparent, especially having an overall light transmission of at least 70 to 75%.

With regard to the composition of the glass substrate, a glass having a linear absorption below 0.01 mm$^{-1}$ in the part of the spectrum useful to the application, generally the spectrum ranging from 380 to 1200 nm, is preferably used.

Even more preferably, extra-clear glass, i.e. glass having a linear absorption below 0.008 mm$^{-1}$ in the wavelength spectrum ranging from 380 to 1200 nm, is used. For example, glass sold under the tradename Diamant by Saint-Gobain Glass may be chosen.

The substrate may be a monolithic, laminated or two-component substrate. After the structuring operation has been carried out, the substrate may also be subjected to various glass conversion operations: tempering, shaping, laminating, etc.

The glass substrate may be thin, for example about 0.1 mm in thickness for mineral glass or 1 mm in thickness for organic glass, or thicker, for example having a thickness greater than or equal to a few mm even cm.

A step of depositing a conductive, semiconductor and/or hydrophobic film, especially an oxide-based film, may be carried out after the or a first structuring operation.

This deposition is preferably carried out continuously.

The film is for example a metal film made of silver or aluminum.

Advantageously, a step may be provided for selectively depositing a conductive film (especially a metallic oxide-based film) on the structured surface, on or between features that are for example dielectric or less conductive.

The, for example, metal, especially silver or nickel, film may be deposited by electrodeposition. In the latter case, to form an electrode for the electrodeposition, the structured film may advantageously be a conductive (semiconductor) film or a dielectric film of the sol-gel type doped with metal particles or even a multilayer with a conductive top seed layer.

The chemical potential of the electrolyte mixture is adapted to promote deposition in high-curvature zones.

After the film has been structured, transfer of the array of features into the glass substrate and/or an underlying layer may be envisioned, especially by etching.

The structured film may be a sacrificial film, which may be partly or completely removed.

In one embodiment, the structured surface may be split into structuring fields, each structuring field containing distinct features (differing in their shape, one of their characteristic dimensions, especially their separation) and/or features with a distinct orientation.

During manufacture of the material, the content of the mobile species and/or the number of mobile species may be different from one zone to another.

Certain zones of a bulk or thin-film oxide may be masked so that the mobile species is not incorporated, or in order to modify locally the incorporation conditions.

Naturally, the structured film may also serve as a mask for an underlying film or the adjacent substrate.

The invention also relates to a product with a structured surface, i.e. with an array of irregularities or features that are submicron-size in height and that have at least one (sub) micron-size characteristic lateral dimension, this solid hybrid material comprising:
  a simple Si oxide or a mixed Si oxide, the Si oxide molar percentage in the material being at least 40%, especially between 40 and 99%; and
  at least one species, of a different nature to the one or more elements of the oxide, and which is especially a metal, the molar percentage of the one or more species in the material ranging from 1 mol % up to 50 mol % while remaining below the percentage of said Si oxide, the species having a maximum largest characteristic dimension smaller than 50 nm, able to be obtained using the process described above.

The structured product may be intended for application in electronics, buildings, or automotive vehicles or even for a microfluidic application.

Mention may especially be made of various products, especially glazing units:
  having modified chemical properties ("super"-hydrophobicity, hydrophilicity);
  having optical properties, especially for illumination systems or systems for backlighting flat LCD displays, especially a light extraction means for a light-emitting device, optical products for example intended for display screen, illumination or signaling applications;
  for buildings, especially a solar and/or thermal control glazing unit.

The function and the properties associated with the structure depend on the characteristic dimensions H, W and D.

The range of optical functionalities of nanostructured products is large. The product may have at least one of the following characteristics:
  the feature is a relief, especially having an average maximum lateral dimension, called the length L, that is submicron-size, and especially having a width W greater than 0.3L for an oblique angle of attack and greater than 0.8L for a normal angle of attack, the material especially being richer in mobile species in the peaks of the reliefs and through a thickness smaller than 10 nm, called the superficial thickness;
  it is an ion-exchanged glass, ion exchanged with silver or copper, or it is a bulk sol-gel or sol-gel film, comprising said species, especially silver or copper and/or gold, on a substrate, especially a transparent substrate;
  the feature is defined by a height H and a width W and a distance D between an adjacent feature;
  the distance D being chosen to be smaller than 5 μm for microfluidic applications or for wetting properties, smaller than 2 μm for infrared applications and smaller than 500 nm, preferably smaller than 300 nm and more preferably smaller than 200 nm for optical applications even extending into the infrared (antireflection, light extraction and light collection for photovoltaics or photocatalysts, etc.);
  the height H preferably being chosen to be greater than 20 nm, more preferably greater than 50 nm and even more preferably greater than 100 nm for optical (visible and infrared) applications, and greater than 70 nm, preferably greater than 150 nm, for wetting properties (superhydrophobicity or superhydrophilicity);
  the width W being chosen to be greater than D/10, more preferably greater than D/5 and even more preferably greater than D/2;
  the feature is defined by a height H and a width W and a distance D between an adjacent feature;
  the distance D being chosen to be smaller than 5 μm for microfluidic applications or for wetting properties and smaller than 2 μm for infrared applications;
  the height H preferably being chosen to be greater than 70 nm, more preferably greater than 150 nm for wetting properties (superhydrophobicity or superhydrophilicity); and
  the width W being chosen to be greater than D/10, more preferably greater than D/5 and even more preferably greater than D/2.

The etched area may form a substrate for growth of a vacuum-deposited thin film, the feature being defined by a height H and a width W and a distance D between an adjacent feature:
  the distance D being chosen to be smaller than 200 nm, preferably to be between 200 nm and 100 nm, more preferably to be smaller than 50 nm;

the height H preferably being chosen to be greater than 20 nm, more preferably greater than 50 nm; and the width W being chosen to be greater than D/10, preferably greater than D/5 and more preferably greater than D/2.

The relief may especially be discrete and conical.

For features in relief, the peaks of the reliefs are enriched with said metal through a thickness, called the superficial thickness, typically of 2 to 10 nm.

For recessed features, the bottoms of the recesses are enriched with said metal through a thickness typically of 2 to 10 nm.

The presence of metal-enriched zones can be verified by known microscopy techniques: TEM, STEM, and/or by chemical mapping using known microscopy or spectroscopy techniques: STEM, EELS, EDX.

Two main areas of said material may be structured with similar or distinct features, simultaneously or in succession.

EXAMPLE OF A FIRST ION-EXCHANGED STRUCTURED GLASS

A first 2 mm-thick silver-ion-exchanged glass pane was obtained after ion exchange with a conventional pane of Planilux® soda-lime float glass from Saint Gobain.

The ion exchange consisted in exchanging sodium ions in the glass with silver from a bath of silver nitrate.

In a first step, the glass was immersed in pure silver nitrate at 300° C. for 2 hours.

The glass obtained had a silver concentration profile from the surface to a depth of several microns.

It was observed that the glass had a slightly yellow color. This color is characteristic of silver nanoparticles. Part of the silver that had penetrated into the glass had been reduced and had aggregated into nanoparticles of a few nanometers in size during the exchange reaction.

The silver had therefore penetrated to a depth of about 4 microns. The silica percentage remained constant, the surface having an almost linear silver concentration profile. It was indeed sodium that had been exchanged with the silver and not calcium, potassium or any other cation in the glass. Silver was therefore probably present in the form of particles to a depth of a few microns.

The surface contained about 15 mol % Ag.

The reactive-ion etching was carried out in a vacuum reactor at a pressure of 0.1 mbar and with a 90 sccm $SF_6$ gas flow. The reactive-ion etching was carried out by virtue of a plasma formed near the surface of the sample using 200 W of radiofrequency power. The surface was etched for 5 minutes.

Figure 1:
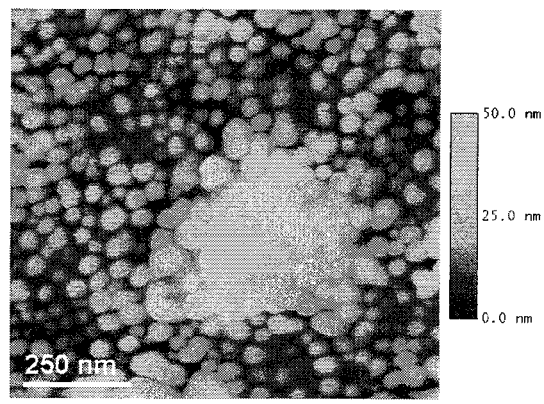
FIG. 1 shows AFM micrographs of a surface of silver-ion-exchanged Planilux glass after erosion for 5 minutes under $SF_6$ plasma.

FIG. 1 shows AFM micrographs of a surface of silver-ion-exchanged Planilux glass after erosion for 5 minutes under $SF_6$ plasma.

The AFM micrographs of the silver glass surface show that a texture consisting of bumps was formed after erosion. These bumps, which are dense (almost joined, W near D) and 60 nanometers in width and 40 nm in height, appeared after only 5 minutes of etching.

The highly selective $SF_6$ plasma preferentially erodes the silica. The residual silver aggregates and protects the surface. It should be noted that the glass not only comprises silver but also $Al_2O_3$, CaO, MgO and $Na_2O$. These compounds also erode less easily than silica, thereby leading to a nonuniform surface.

Figure 2:
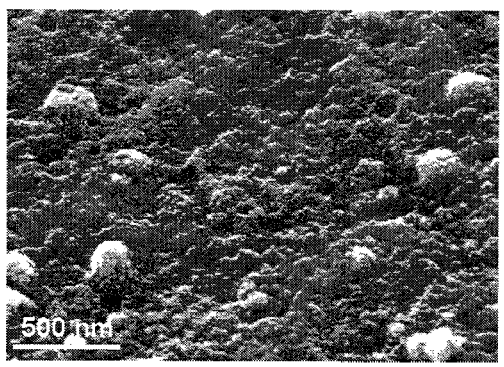
FIG. 2 shows an SEM micrograph of the same sample as in FIG. 1, taken at an angle of 45°.

FIG. 2 shows an SEM micrograph of the same sample as in FIG. 1, taken at an angle of 45°. It may be seen that the surface is formed of dense bumps, with the presence of large protuberances about 200 nm in height, separated by a number of microns, not adversely affecting optical applications in particular. The fact that the glass does not consist only of silicon and copper is likely to be responsible for this surface nonuniformity.

Such micrographs were taken in a number of locations on the surface of the sample. It was thus possible to verify that the texture observed by AFM indeed existed over the entire area exposed to the $SF_6$ beam. The structure is therefore not linked to an edge effect.

To summarize, Planilux® glass that was ion exchanged with silver was eroded. During the erosion, bumps were formed over the entire area. The bumps obtained had a diameter W of 60 nm and an average height H of 40 nm. After the erosion, the yellowing of the sample was almost no longer visible.

The erosion was nondirectional. A larger and more regular structure may be obtained by applying an electric field perpendicular to the surface, thereby making the RIE directional. The masking effect is increased and a larger structure may be obtained, or a given structure may be obtained more rapidly.

Examples of Structured Silica/Silver Sol-Gel Films

A second hybrid material was prepared using the sol-gel process and eroded.

The sol-gel process allows a mineral polymer, such as silica, to be synthesized at room temperature from organic precursors. In a first step, this precursor is mixed with water so as to hydrolyze it. The solution obtained (called a sol) may be deposited on various substrates such as glass or silicon substrates. During the deposition, the solvent of the solution evaporates until the hydrolyzed precursor condenses to form a mineral polymer matrix. The oxide gel obtained may be shaped, especially into a thin film, until the polymer has completely condensed.

The deposition conditions (rotation speed) allow the thickness to be controlled. Thus, the thickness of the film can be varied over a wide range (from about ten nanometers to a few microns). Other compounds can be added during the hydrolysis such as dyes; dopants; surfactants, which confer a porosity on the film; or organic compounds, which are not altered by the synthesis because it is carried out at room temperature.

Silica films a few hundred nanometers in thickness containing 10 mol % of silver were synthesized by the sol-gel process.

To prepare the silica/silver sol: a sol of 10 wt % TEOS (2 g, 9.6 mmol) in a pH 2 solution of $HNO_3$ (18 g) was prepared and left for three hours with stirring. These pH conditions allowed a high hydrolysis rate while slowing the condensation. After the ethanol formed during the reaction had been evaporated under vacuum, an $AgNO_3$ solution was added to the sol (1 mL, 1 mol·$L^{-1}$) so that $n_{Ag}$=[Ag]/([Ag]+[Si]) such that $n_{Ag}$>10%.

The thickness of the silver-containing sol-gel film was measured by ellipsometry and was 250±20 nm.

Deposition and post-deposition treatment: the silver-containing sols were deposited by spin coating on the substrate (1000 rpm, 100 rpm/s for 2 min).

The samples obtained were baked overnight at 200° C. so as to remove residual solvent from the film and initiate condensation of the silica matrix. A heat treatment at a higher temperature $T_{anneal}$ (700° C.) was applied to the silver-containing samples so as to finish the condensation and cause silver aggregates to form. Their heat treatment determined the oxidation state of the silver. To obtain silver metal, the temperature of the anneal had to be between 500° C. and 750° C.

The agent-containing silica film was structured under the effect of the etching. Bumps of a few tens of nanometers in size were formed and distributed over the entire surface of the material.

It was seen above that films annealed at 700° C. contained aggregates of metal silver. These holes are possibly therefore a result of the protection provided by these nanoparticles. Nevertheless, particles commonly observed in silver-containing sol-gel films have characteristic sizes smaller than those of the holes observed. The silver must therefore diffuse and segregate.

Figure 3:
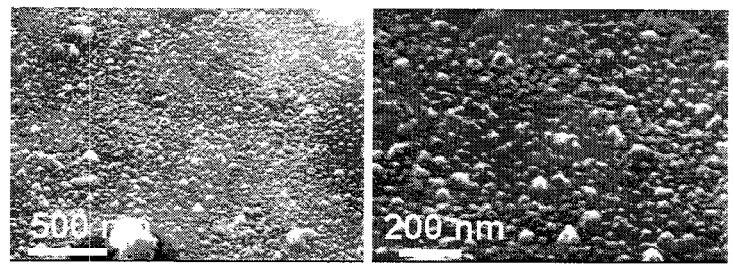
FIG. 3 shows two SEM micrographs, at different scales and at 45°, of thin silver-doped silica sol-gel films after RIE treatment.

FIG. 3 shows two SEM micrographs, at different scales and at 45°, of thin silver-doped silica sol-gel films after RIE treatment.

The bumps are of similar size to those obtained after erosion of the silver-ion-exchanged glass. In contrast, the surface is much more uniform, this is due to the fact that only silica and silver are present (i.e. to the purity of the hybrid oxide). The manufacture of samples using the sol-gel process therefore seems to be a particularly promising way of texturing transparent areas by RIE.

Examples of Structured Silica/Copper Sol-Gel Films

Similarly to the silver examples, silica sol-gel films containing 10 mol % copper were produced.

To prepare the silica/copper sol: a sol of 15 wt % TEOS (3 g, 9.6 mmol) in ethanol (17 g) was prepared.

Copper acetate (320 mg, $1.6 \times 10^{-3}$ mol) and the stoichiometric amount (1 g, $57.7 \times 10^{-3}$ mol) of water required to hydrolyze the TEOS and the acetate were then added. After the pH had been adjusted to 3, the solution was left for two hours at reflux at 70° C. The molar ratio in the sol was $n_{Cu} = [Cu]/([Cu]+[Si]) = 10\%$.

The structure was examined after 5 minutes of erosion at room temperature.

Figure 4:
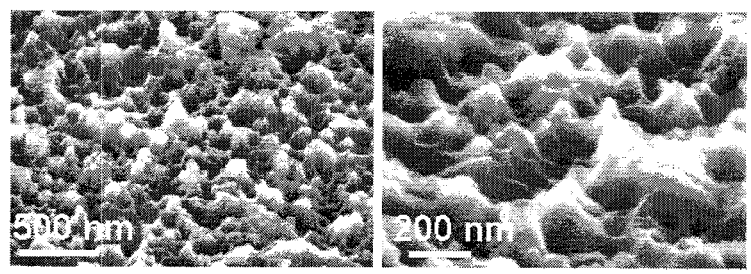
FIG. 4 shows SEM images of the surface taken at 45°.

FIG. 4 shows SEM images of the surface taken at 45°. A very sharp relief was observed to appear. Reliefs were formed that were dense (but of nonuniform morphology and size) and several hundred nanometers in height H and width W. The surface was still more uniform than was the case for glass, because the surface consisted only of silica and copper. The nonuniformity of the structures is likely to be caused by the nondirectional erosion employed.

The copper incorporated in the silica allows highly structured surfaces to be rapidly obtained after erosion, with bumps more than 100 nm in height. Making the erosion directional may allow more uniform bumps, of more regular shape and of higher aspect ratio, to be obtained.

Three hybrid metal/silica materials were produced. Two processes were used to synthesize these systems: the sol-gel process and ion exchange. In both cases, bumps were observed to form.

| Sample No. | Metal | Deposition method | H (nm) | W (nm) | D (nm) |
|---|---|---|---|---|---|
| 1 | Ag | Ion exchange | 40 | 60 | 60 |
| 2 | Ag | Sol-gel | 40 | 60 | 60 |
| 3 | Si | Sol-gel | 150 | 200 | 200 |

The sol-gel process made it possible to stop parasitic protuberances from forming, in contrast to ion-exchange with glass. The uniformity may be improved by making the erosion directional.

The invention claimed is:

1. A process for forming at least one array of irregularities or features that are submicron-size in height and that have at least one characteristic lateral dimension that is micron- or submicron-size, over a surface of a material by reactive-ion etching, the process comprising:
   supplying said material with a thickness at least equal to 100 nm, the material being a solid hybrid material that comprises:
      a simple silicon oxide or a mixed silicon oxide, a majority of oxides in the case of a mixed oxide being silicon oxide, an oxide molar percentage in the material being at least 40%; and
      at least one species, a molar percentage of the at least one species in the material ranging from 1 mol % up to 50 mol % while remaining below the percentage of said silicon oxide, at least most of the at least one species having a largest characteristic dimension smaller than 50 nm,
   optionally heating said hybrid material before carrying out said reactive-ion etching;
   after said supplying and said optional heating, structuring the surface of said hybrid material, without masking, with the reactive-ion etching that lasts less than 30 minutes over an etching area greater than 1 cm², until said array of features is formed, the structuring optionally being accompanied by heating of the hybrid material, wherein said solid hybrid material is a film deposited by physical vapor deposition, on a substrate, by codeposition of the at least one species and the silicon oxide, the at least one species being a metal species selected from the group consisting of copper, silver and gold, using metal targets in an oxygen atmosphere.

2. The process as claimed in claim 1, wherein the material is heated to a temperature of 70° C. or more, before the reactive-ion etching and/or during the reactive-ion etching.

3. The process as claimed in claim 1, wherein said at least one species is ionized.

4. The process as claimed in claim 3, wherein the ionized species is copper in silica.

5. The process as claimed in claim 1, wherein said solid hybrid material is metastable before said etching.

6. The process as claimed in claim 1, wherein, after said supplying, the solid hybrid material is heated to a temperature greater than 70° C. before the reactive-ion etching and/or during the reactive-ion etching.

7. The process as claimed in claim 1, wherein, after said supplying, the solid hybrid material is heated to a temperature ranging from 120 to 300° C., before the reactive-ion etching and/or during the reactive-ion etching.

* * * * *